M. LEITCH.
MILKING MACHINE.
APPLICATION FILED FEB. 16, 1915.

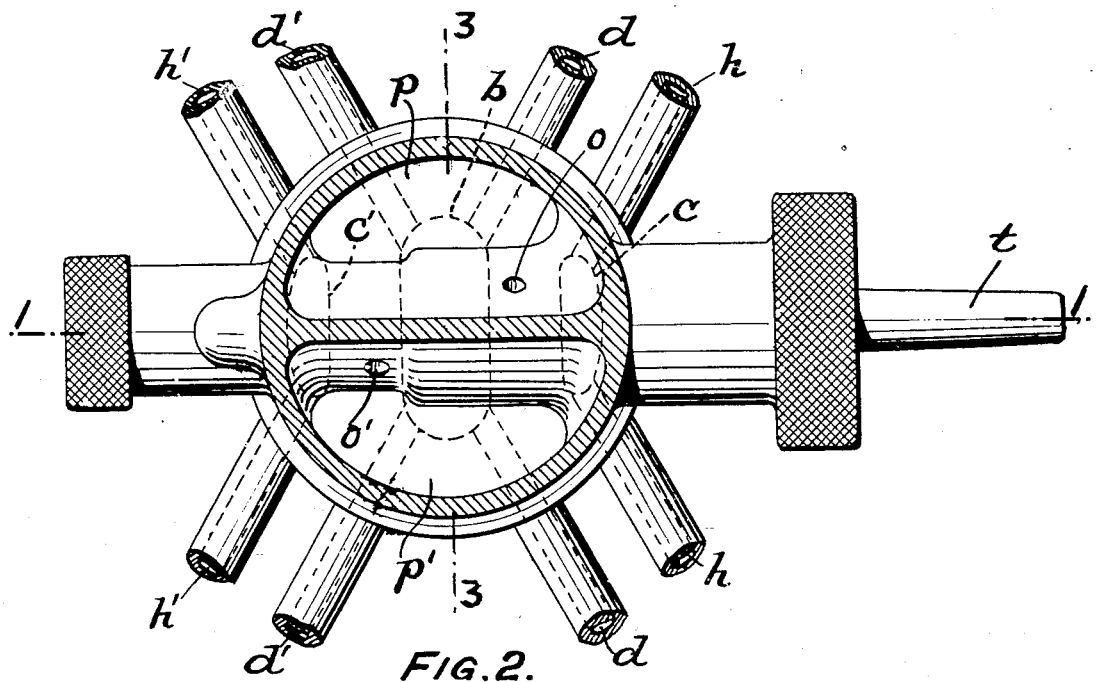
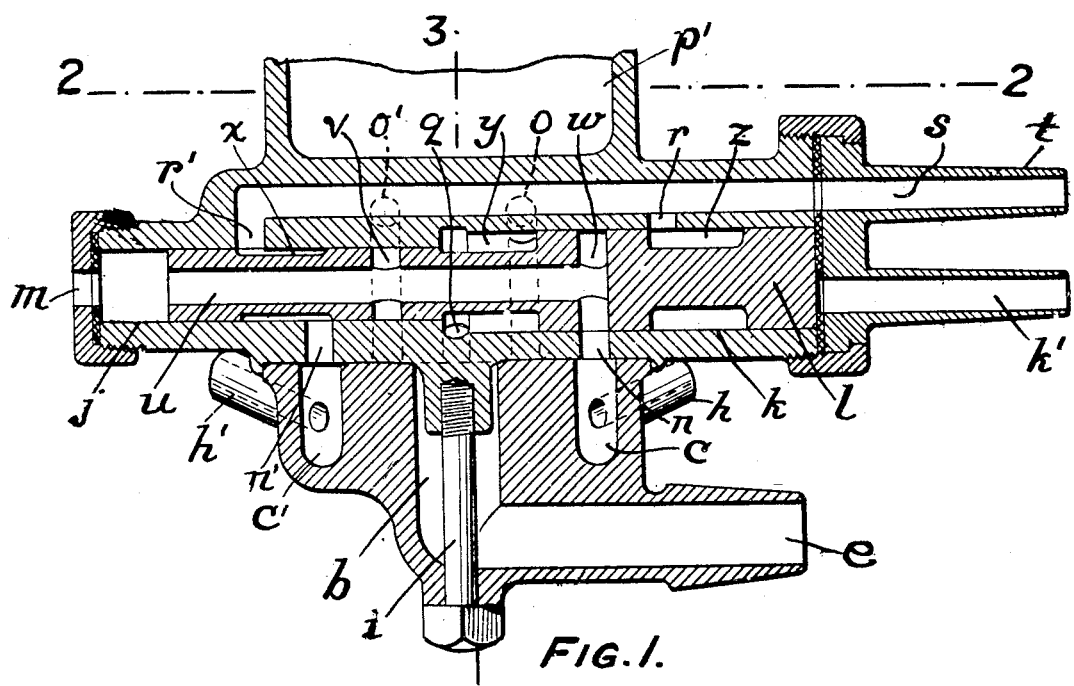

1,195,997.

Patented Aug. 29, 1916.
2 SHEETS—SHEET 2.

WITNESSES:

INVENTOR
Meredith Leitch
BY
Frank S. Busser
ATTORNEY.

UNITED STATES PATENT OFFICE.

MEREDITH LEITCH, OF POUGHKEEPSIE, NEW YORK, ASSIGNOR TO THE DE LAVAL SEPARATOR COMPANY, A CORPORATION OF NEW JERSEY.

MILKING-MACHINE.

1,195,997.  Specification of Letters Patent.  Patented Aug. 29, 1916.

Application filed February 16, 1915. Serial No. 8,458.

*To all whom it may concern:*

Be it known that I, MEREDITH LEITCH, a citizen of the United States, residing at Poughkeepsie, county of Dutchess, and State of New York, have invented a new and useful Improvement in Milking-Machines, of which the following is a full, clear, and exact description, reference being had to the accompanying drawings, which form a part of this specification.

My invention relates to cow milking machines of the type having two-chambered teat cups. Previously used machines of this type may be divided into two classes. The first and larger class has an individual air-driven engine to operate the valves for each machine. This makes the machines complicated, expensive and liable to get out of order. The second class has a master pulsator that supplies pneumatic, electric or other impulses to operate the milking machine valve. These, in addition to the master pulsator, require separate pipes or wires to convey the master pulsations and so add to the complication and cost. Both require a vacuum pump and in some cases an air compressing pump also.

One object of my invention is to provide a milking machine with which one pump cylinder or its equivalent serves as both exhauster and master pulsator and wherein one pipe line serves to convey master pulsations and at the same time carry air from the machines.

Some machines using double chambered teat cups exhaust the air from the outer or teat compressing chamber into the milk passages to cause momentary reductions in the vacuum acting on the teats. Because the above mentioned chambers are difficult to clean or inspect the air from them tends to be foul and cause a great bacterial contamination of the milk.

A second object of my invention is to dispose of the foul air without contact with the milk and to provide clean air to break the vacuum in the teat cups.

Figure 4:
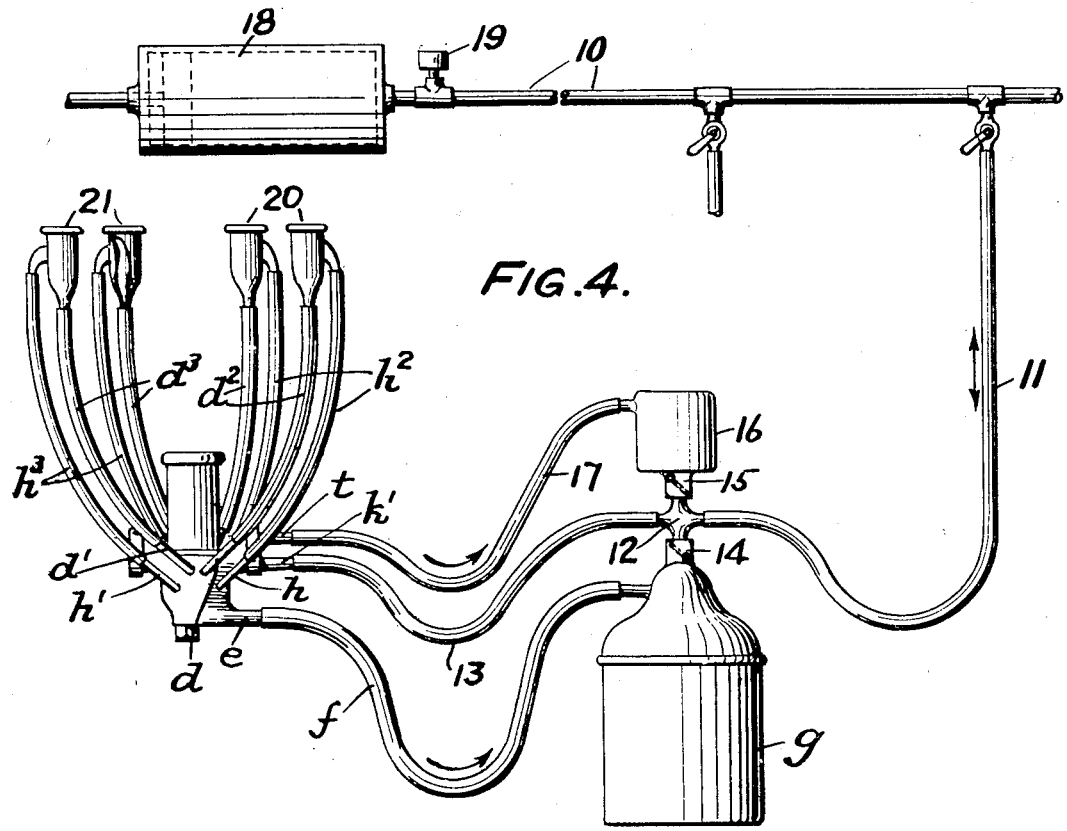
Figure 3:
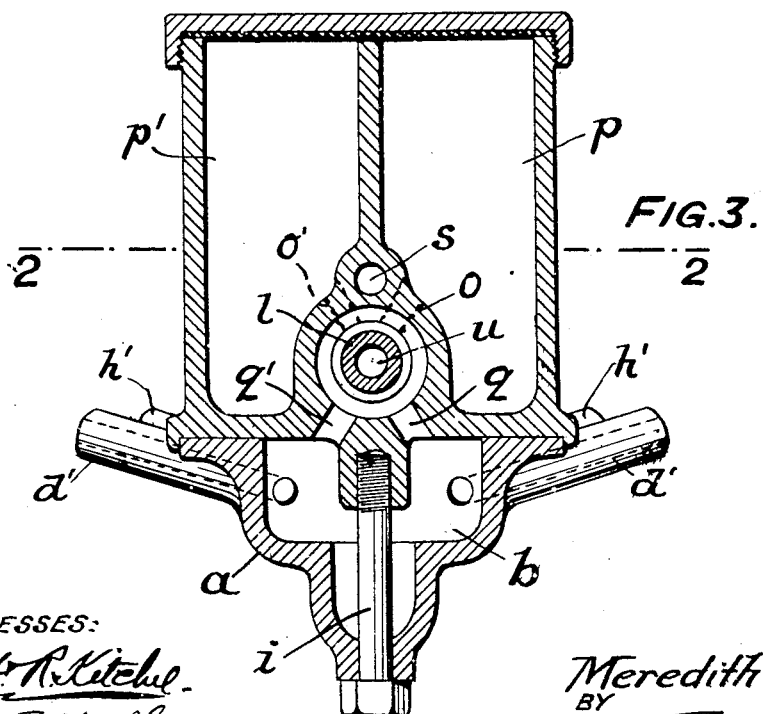

In the accompanying drawings, which illustrate a preferred embodiment of my invention, Figure 1 is a vertical sectional view of the pulsator on the line 1—1 of Fig. 2. Fig. 2 is a horizontal section on the line 2—2 of Figs. 1 and 3. Fig. 3 is a vertical section on the line 3—3 of Figs. 1 and 2. Fig. 4 is a diagrammatic view of a complete installation.

The claw $a$ has a central chamber $b$ and two flanking chambers $c$ and $c'$. Two tubes $d$ and two tubes $d'$ communicate with the central chamber $b$ and have outer ends adapted to connect respectively to tubes $d^2$, $d^3$, from the teat receiving chambers of the respective teat cups 20, 21. The chamber $b$, through a tube $e$, and a flexible tube $f$, communicates with the milk pail $g$. From the flanking chamber $c$ extend two tubes $h$. From the flanking chamber $c'$ extend two tubes $h'$. These tubes by flexible extensions $h^2$ and $h^3$ communicate with the outer or manipulating chambers of the teat cups.

On top of the claw $a$ and held to it by the screw $i$ is the cylinder of the pulsator proper. The cylinder has a smaller bore $j$ and a larger bore $k$, in which operates the differential piston and valve $l$. The smaller bore $j$ is by the port $m$ in communication with the atmosphere and the larger bore $k$ is by the pipe $k'$ and extension thereof in communication with a source of pneumatic pulsation (hereinafter described) by which the piston $l$ is caused to reciprocate. From the differential cylinder, ports $n$ and $n'$ open to chambers $c$ and $c'$, ports $o$ and $o'$ lead to air reservoirs $p$ and $p'$, ports $q$ and $q'$ to the chamber $b$, and ports $r$ and $r'$ to the passage $s$, which by the tube $t$ and extensions thereof is in communication with a source of suction hereinafter described. The piston valve $l$ has a central passage $u$ from which ports $v$ and $w$ lead through its wall. It also has three annular grooves $x$, $y$ and $z$.

The pipe 11 from the pulsation line 10 comes to a cross connection 12, one branch of which is coupled by a flexible tube 13 to the pipe $k'$ from the pulsator. Another branch of cross connection 12 connects through a check valve 14 to the milk pail. The third branch of the cross connection 12 connects through a check valve 15 to a vacuum chamber 16, which is connected through a flexible tube 17 with the tube $t$. A pump 18 on the main pulsation line 10 draws air intermittently from the pipe line and discharges it through the discharge valve 19, thus causing pulsations in the line varying from atmospheric pressure to a minimum depending on the relative volumes of the pump cylinder and the pipe line. As soon as connection is made to the pipe line, the air is partly exhausted, first, from the vacuum chamber 16 and through it from the passage *s* in the pulsator; second, from the milk pail *g* and through it from the central chamber *b* of the claw; and third, from the larger bore *k* of the pulsator cylinder. Air at atmospheric pressure entering through the opening *m* moves the piston valve *l* to the right—the position shown in Fig. 1. Air previously stored in the reservoir *p* passes through the port *o*, the annular groove *y* and the ports *q* to the chamber *b*, momentarily reducing the vacuum in this chamber and in the inner chambers of the teat cups. Air at atmospheric pressure, passing by way of port *m*, passage *u*, port *w* and port *n*, enters the chamber *c* and thence, through tubes *h*, *h*, reaches the outer chambers of two teat cups and, because the inner chambers of the same teat cups are in communication with vacuum, causes the inner chamber to collapse and compress the teat.

The chamber *c'* is by the port *n'*, the annular groove *x* and port *r'* in communication with the passage *s*, so that air is exhausted from the chamber *c'* and also through tubes *h'*, *h'*, from the outer chambers of the corresponding teat cups, thus allowing the flexible liners separating the inner and outer chambers of such teat cups to assume their normal size and release the teats. The air exhausted from the outer chambers of such teat cups enters the vacuum chamber 16 and from there, through the check valve 15 and the cross connection 12, reaches the suction pipe, but is prevented by the check valve 14 from reaching the milk pail *g* and contaminating the milk. Air at the same time passes through the ports *v* and *o'* to fill the reservoir *p'*. When air at atmospheric pressure is admitted through pipes 10, 11 and 13 and tube *k'* to the larger bore *k* of the differential cylinder, the valve *l* is forced to the opposite end of its stroke because of the reduced pressure on the differential area due to the center of the cylinder being in communication with the vacuum. With the valve *l* in this position the reservoir *p'* discharges through the port *o'*, annular groove *y* and the ports *q* into the chamber *b* causing a momentary break of the vacuum in this chamber and in the connected teat cups. The reservoir *p* is filled through the port *m*, the passage *u* and the ports *w* and *o*. Air also passes from the passage *u* through ports *v* and *n'* into the chamber *c'* and the outer chambers of the two connected teat cups and compresses the teats. Air from the outer chambers of the two teat cups connected to chamber *c* passes through port *n*, annular groove *z* and port *r* to the passage *s* and thence through the tube *t* and pipe 17 to the vacuum chamber 16. Milk drawn from the teats passes through the tubes *d* and *d'* to the chamber *b* and thence through the tubes *e* and *f* to the milk pail *g*. It is because of obstruction of the tube *f* by milk that the admission of a small quantity of air to the chamber *b* causes a decided reduction in the vacuum in this chamber and the connected teat cups. When the master pulsator or pump 18 connects the tube *k'* with vacuum, atmospheric pressure acting on the smaller end of the piston valve *l* returns it to the position shown and the cycle is repeated.

If it is desired to have the number of vacuum breaks the same as the number of teat compressions, only one air reservoir will be needed. If the four teats are to be compressed simultaneously, only one flanking chamber will be needed.

It will be observed that the construction is such that the pump 18 performs the functions of both an exhauster and a master pulsator and that one pipe line acts both to convey master pulsations and carry air from the machines. It will also be observed that the outer or teat compressing chambers of the teat cups, while receiving air from the same source (port *m*) that conveys air to the milk passage, has no connection with the milk passage, and that the air exhausted from such chambers is disposed of without entering the milk passage and without contact with the milk, thus avoiding the danger of bacterial contamination of the milk.

I have filed of even date herewith another application for patent for a milking machine, Serial No. 8456 having certain features in common with the machine herein shown and described, and have claimed therein such features; the claims herein being restricted to novel features not disclosed in said application.

Having now fully described my invention what I claim and desire to protect by Letters Patent is:

1. In a milking machine, in combination, a double chambered teat cup, a milk discharge from the inner chamber thereof constantly under suction, and means, including passages closed from intercommunication, to intermittently admit pressure fluid to the milk discharge and to alternately connect the outer teat cup chamber with pressure fluid supply and exhaust.

2. In a milking machine, in combination, a double chambered teat cup, two pipes and means to create constant suction therein, one of said pipes being connected with the inner teat cup chamber, and means, including valve mechanism and independent non-intercommunicating air ports, to connect the other pipe with the outer teat cup chamber and to intermittently admit air to the respective teat cup chambers.

3. In a milking machine, in combination, a double chambered teat cup, two pipes and means, including a common pipe, to create a continuous suction therein, one of said pipes being connected with the inner teat cup chamber, and means, including valve mechanism and independent non-intercommunicating ports, to connect the other pipe with the outer teat cup chamber and to intermittently admit air to the respective chambers.

4. In a milking machine, in combination, a double chambered teat cup, a milk discharge from the inner chamber of the teat cup constantly under suction, and means, including valve mechanism and independent non-intercommunicating passages connecting with the milk discharge and with the outer teat cup chamber, to exhaust pressure fluid from the outer teat cup chamber and to intermittently connect both the milk discharge and the outer teat cup chamber with pressure fluid.

5. In a milking machine, in combination, a double chambered teat cup, a milk discharge from the inner chamber of the teat cup, a vacuum pipe, means, including valve mechanism and independent passages communicating with the milk discharge and with the outer teat cup chamber, to intermittently connect the milk discharge and the inner teat cup chamber with pressure fluid and to intermittently connect the outer teat cup chamber with the vacuum pipe, and means to create a continuous suction in both the vacuum pipe and the milk discharge.

6. In a milking machine, in combination, a double chambered teat cup, non-intercommunicating passages connected to the respective chambers, a vacuum pipe, means to create a continuous suction in said pipe and in the passage to the inner teat cup chamber, and a valve adapted to connect the passage to the outer teat cup chamber alternately with the vacuum pipe and with a source of pressure fluid supply.

7. In a milking machine, in combination, a double chambered teat cup, a milk discharge connected with the inner chamber and constantly under suction, a vacuum pipe closed against communication with said milk discharge, a passage connected to the outer teat cup chamber, and valve mechanism adapted to intermittently connect a source of pressure fluid with the inner teat cup chamber and adapted also to connect said passage alternately with the vacuum pipe and a source of pressure fluid.

8. In a milking machine, in combination, a double chambered teat cup, a milk discharge from the inner teat cup chamber and a vacuum pipe closed from communication with the milk discharge, a second pipe, a valve, means to establish a partial vacuum in both the milk discharge and the vacuum pipe and to pneumatically control the operation of the valve through the second pipe, said valve in its movement connecting the outer teat cup chamber alternately with the vacuum pipe and a source of pressure fluid supply.

9. In a milking machine, in combination, a double chambered teat cup, a milk discharge from the inner chamber thereof, a separate vacuum pipe, valve mechanism adapted in its movement to connect the outer teat cup chamber alternately with the vacuum pipe and an air supply and to intermittently connect the inner teat cup chamber with an air supply independent of the outer teat cup chamber, a second pipe connected with a pressure area of the valve, and means to exhaust air from both the vacuum pipe and the milk discharge and to create pneumatic pulsations in the second pipe to control the movement of the valve.

10. In a milking machine, in combination, a double chambered teat cup, a pressure-operated valve, four passages, one connected with the outer teat cup chamber, the second, closed from communication with the first, with the inner teat cup chamber, the third with a pressure face of the valve, and the fourth adapted for connection with the first as hereinafter defined, and means to produce pneumatic pulsations in the third passage and to create a continuous suction in the second and fourth passages, said valve in its movement adapted to alternately admit pressure to the first passage and to connect the first and fourth passages.

11. In a milking machine, in combination, a double chambered teat cup; independent non-intercommunicating passages to both chambers of the teat cup; means to create suction in both passages, said means including a pipe, means producing pneumatic pulsations therein and pressure operated valve mechanism controlled in its operation by said pulsations; said valve mechanism in its operation adapted also to intermittently admit pressure fluid to both passages.

12. In a milking machine, in combination, a double chambered teat cup, a milk discharge from the inner chamber of the teat cup, a pipe connection from the outer chamber of the teat cup and closed from communication with the milk discharge, a valve chamber interposed in said pipe connection, a valve in the valve chamber, a pipe connected with a pressure face of the valve, means to create suction in the milk discharge and to produce pneumatic pulsations in said pipe to control the operation of the valve, said valve in its movement intermittently connecting the outer teat cup chamber, through said pipe connection, with a source of fluid pressure supply.

13. In a milking machine, in combination, a double chambered teat cup, a milk discharge from the inner chamber of the teat cup, a pipe connection from the outer chamber of the teat cup and closed from communication with the milk discharge, a valve chamber interposed in said pipe connection, a valve in the valve chamber, a pipe connected with a pressure face of the valve, means to create suction in the milk discharge and in the outer end of said pipe connection and to produce pneumatic pulsations in said pipe to control the operation of the valve, said valve in its movement alternately opening and closing said pipe connection and in its closing movement connecting the outer chamber of the teat cup, through said pipe connection, with a source of fluid pressure.

14. In a milking machine, in combination, a double chambered teat cup, a milk discharge from the inner chamber of the teat cup, a pipe connection from the outer chamber of the teat cup and closed from communication with the milk discharge, a valve chamber interposed in said pipe connection, a valve in the valve chamber, a pipe connected with a pressure face of the valve, means to create suction in the milk discharge and in the outer end of said pipe connection and to produce pneumatic pulsations in said pipe to control the operation of the valve, said valve in its movement intermittently opening and closing said pipe connection and admitting pressure fluid both to said pipe connection and to the milk discharge.

15. In a milking machine, in combination, a double chambered teat cup, a milk discharge from the inner chamber of the teat cup, a pipe connection from the outer chamber of the teat cup and closed from communication with the milk discharge, a valve chamber interposed in said pipe connection, a valve in the valve chamber, a pipe connected with a pressure face of the valve, means to create suction in the milk discharge and in the outer end of said pipe connection and to produce pneumatic pulsations in said pipe to control the operation of the valve, said valve in its movement alternately opening and closing said pipe connection and in its closing movement connecting the outer chamber of the teat cup, through said pipe connection, with a source of fluid pressure supply, and also intermittently admitting pressure fluid to the milk discharge.

16. In a milking machine, in combination, a main pipe, means to produce pneumatic pulsations therein, a double-chambered teat cup, passages, means connecting said passages with the respective teat cup chambers, and check valve connections between the main pipe and both passages to establish suction therein.

17. In a milking machine, in combination, a main pipe, means to produce pneumatic pulsations therein, a double chambered teat cup, passages, check valve connections between the main pipe and both passages to establish suction therein, and means connecting said passages with the respective teat cup chambers, said means including a valve controllable by said pneumatic pulsations to intermittently admit pressure fluid to the outer chamber of the teat cup.

18. In a milking machine, in combination, a main pipe, means to produce pneumatic pulsations therein, a double chambered teat cup, passages one of which communicates with the inner teat cup chamber, check valve connections between the main pipe and both passages to establish suction therein, and means controllable by said pneumatic pulsations to alternately admit pressure fluid to the outer teat cup chamber and connect it with the other passage.

19. In a milking machine, in combination, a main pipe, means to produce pneumatic pulsations therein, a double chambered teat cup, passages one of which communicates with the inner teat cup chamber, check valve connections between the main pipe and both passages to establish suction therein, and means controllable by said pneumatic pulsations to intermittently admit pressure fluid to the milk discharge and also alternately admit pressure fluid to the outer chamber of the teat cup and connect it with the other passage.

20. In a milking machine, in combination, a main pipe, means to produce pneumatic pulsations therein, a double chambered teat cup, passages one of which communicates with the inner teat cup chamber, an air valve, said pipe connecting with said valve to control its operation, check valve connections between the main pipe and both passages to establish suction therein, said air valve in its movement intermittently admitting air to each teat cup chamber and also intermittently connecting the outer teat cup chamber with the other passage.

21. In a milking machine, in combination, a double chambered teat cup, a milk discharge from the inner teat cup chamber, a valve chamber, a valve therein, independent passages from the valve chamber to both chambers of the teat cup, a main pipe connected with a pressure face of the valve, a vacuum pipe connected with the valve chamber, means to produce pneumatic pulsations in the main pipe and create suction in the vacuum pipe and milk discharge said valve in its movement alternately connecting the passage to the outer teat cup chamber with the vacuum pipe and a source of fluid pressure supply and also intermittently admitting pressure fluid to the milk discharge.

22. In a milking machine, in combination, a double chambered teat cup, a milk discharge from the inner teat cup chamber, a valve chamber, a valve therein, independent passages from the valve chamber to both chambers of the teat cup, a main pipe connected with a pressure face of the valve, a vacuum pipe connected with the valve chamber, means to produce pneumatic pulsations in the main pipe, independent check valve connections between the main pipe and the vacuum pipe and milk discharge, thereby producing suction in both, said valve in its movement alternately connecting the passage to the outer teat cup chamber with the vacuum pipe and a source of fluid pressure supply and also intermittently admitting pressure fluid to the milk discharge.

23. In a milking machine, in combination, a double chambered teat cup, an air reservoir, a vacuum pipe, a milk discharge from the inner teat cup chamber, a passage connecting with the outer teat cup chamber, a valve adapted in its movement to connect the air reservoir alternately with the atmosphere and with the milk discharge and to connect said passage alternately with the vacuum pipe and with the atmosphere, and means to create suction in the vacuum pipe and milk discharge and to control the operation of the valve.

24. In a milking machine, in combination, a double chambered teat cup, an air reservoir, a vacuum pipe, a milk discharge from the inner teat cup chamber, a passage connecting with the outer teat cup chamber, a valve adapted in its movement to connect the air reservoir alternately with the atmosphere and with the milk discharge and to connect said passage alternately with the vacuum pipe and with the atmosphere, a pipe leading to a pressure face of the valve, and means to produce pneumatic pulsations in said pipe and to create suction in the vacuum pipe and milk discharge.

25. In a milking machine, in combination, a double chambered teat cup, an air reservoir, a vacuum pipe, a milk discharge from the inner teat cup chamber, a passage connecting with the outer teat cup chamber, a valve adapted in its movement to connect the air reservoir alternately with the atmosphere and with the milk discharge and to connect the said passage alternately with the vacuum pipe and with the atmosphere, a pipe connecting with a pressure face of the valve, means to produce pneumatic pulsations in said pipe, and independent check valve connections from said pipe to the vacuum pipe and to the milk discharge to establish suction therein.

26. In a milking machine, in combination, a double chambered teat cup, a claw having a milk receiving chamber connectible with the inner teat cup chamber and a pulsation chamber connectible with the outer teat cup chamber, a valve chamber, a vacuum pipe closed from communication with the milk receiving chamber, a valve movable in the valve chamber adapted to connect the pulsation chamber alternately with the vacuum pipe and with a source of pressure fluid supply and adapted also to intermittently admit pressure fluid to the milk receiving chamber, and means to create suction in the vacuum pipe and in the milk receiving chamber and to control the operation of the valve.

27. In a milking machine, in combination, a double chambered teat cup, a claw having a milk receiving chamber connectible with the inner teat cup chamber and a pulsation chamber connectible with the outer teat chamber, a valve chamber, a vacuum pipe closed from communication with the milk receiving chamber, a valve movable in the valve chamber adapted to connect the pulsation chamber alternately with the vacuum pipe and with a source of pressure fluid supply and adapted also to intermittently admit pressure fluid to the milk receiving chamber, a pipe leading to a pressure face of the valve, and means to produce pneumatic pulsations in said pipe and to create suction in the vacuum pipe and milk receiving chamber.

28. In a milking machine, in combination, a double chambered teat cup, a claw having a milk receiving chamber connectible with the inner teat cup chamber and a pulsation chamber connectible with the outer teat cup chamber, a valve chamber, a vacuum pipe, a valve movable in the valve chamber adapted to connect the pulsation chamber alternately with the vacuum pipe and with a source of pressure fluid supply and adapted also to intermittently admit pressure fluid to the milk receiving chamber, a pipe connecting with a pressure face of the valve, means to produce pneumatic pulsations in said pipe, and independent check valve connections from said pipe to the vacuum pipe and milk receiving chamber to create suction therein.

29. In a milking machine, in combination, a double chambered teat cup, a claw having a milk receiving chamber connectible with the inner teat cup chamber, a pulsation chamber connectible with the outer teat cup chamber, and a valve chamber, an air reservoir, a vacuum pipe, a valve movable in the valve chamber and adapted to connect the air reservoir alternately with the atmosphere and with the milk receiving chamber and to connect the pulsation chamber alternately with the atmosphere and with the vacuum pipe, and means to create suction in the vacuum pipe and in the milk receiving chamber and to control the operation of the valve.

30. In a milking machine, in combination, a double chambered teat cup, a claw having a milk receiving chamber connectible with the inner teat cup chamber, a pulsation chamber connectible with the outer teat cup chamber, and a valve chamber, an air reservoir, a vacuum pipe, a valve movable in the valve chamber and adapted to connect the air reservoir alternately with the atmosphere and with the milk receiving chamber and to connect the pulsation chamber alternately with the atmosphere and with the vacuum pipe, a pipe leading to a pressure face of the valve, and means to produce pneumatic pulsations in said pipe and to create suction in the vacuum pipe and milk receiving chamber.

31. In a milking machine, in combination, a double chambered teat cup, a claw having a milk receiving chamber connectible with the inner teat cup chamber, a pulsation chamber connectible with the outer teat cup chamber, and a valve chamber, an air reservoir, a vacuum pipe, a valve movable in the valve chamber and adapted to connect the air reservoir alternately with the atmosphere and with the milk receiving chamber and to connect the pulsation chamber alternately with the atmosphere and with the vacuum pipe, a pipe connecting with a pressure face of the valve, means to produce pneumatic pulsations in said pipe, and independent check valve connections from said pipe to the vacuum pipe and milk receiving chamber to create suction therein.

32. In a milking machine, in combination, a double chambered teat cup, a claw having a milk receiving chamber connectible with the inner teat cup chamber, a pulsation chamber connectible with the outer teat cup chamber, and a valve chamber, a differential valve having a hollow central portion open to the atmosphere at its end of smaller diameter, an air reservoir, a vacuum pipe, said valve movable in the valve chamber and adapted to connect the air reservoir alternately with the milk receiving chamber and with the hollow central portion of the valve and to connect the pulsation chamber alternately with the vacuum pipe and with the hollow central portion of the valve, a pipe connecting with the enlarged end of the valve, and means to produce pneumatic pulsations in the pipe and to create suction in the milk receiving chamber and in the vacuum pipe.

33. In a milking machine, in combination, four double chambered teat cups, a vacuum pipe, a claw having a milk receiving chamber in communication with the inner chambers of the four teat cups, two pulsation chambers each in communication with the outer chambers of two teat cups, a valve, a master pulsator adapted to control the operation of the valve and to create suction in the vacuum pipe and in the milk receiving chamber, said valve adapted in its movement to connect the pulsation chambers alternately with a source of pressure fluid supply and with the vacuum pipe and to intermittently connect the milk receiving chamber with a source of pressure fluid supply.

34. In a milking machine, in combination, four double chambered teat cups, a vacuum pipe, a claw having a milk receiving chamber in communication with the inner chambers of the four teat cups, two pulsation chambers each in communication with the outer chambers of two teat cups, a valve, an air reservoir, a master pulsator adapted to control the operation of the valve and to create suction in the vacuum pipe and in the milk receiving chamber, said valve adapted in its movement to connect said air reservoir alternately with the atmosphere and with the milk receiving chamber and also to connect the pulsation chambers alternately with the atmosphere and with the vacuum pipe.

35. In a milking machine, in combination, four double chambered teat cups, a vacuum pipe, a milk pail, a claw having a milk receiving chamber in communication with the inner chambers of the four teat cups and with the milk pail, two pulsation chambers each in communication with the outer chambers of two teat cups, an air reservoir, a valve chamber, a valve therein adapted to be controlled in its movement by master pulsations and adapted in its movement to connect said air reservoir alternately with the atmosphere and with the milk receiving chamber and also to connect the pulsation chambers alternately with the atmosphere and with the vacuum pipe.

36. In a milking machine, in combination, four double chambered teat cups, a vacuum pipe, a milk pail, a main pipe, independent connections, including non-return valves, from the main pipe to the milk pail and the vacuum pipe, means to produce master pulsations in the main pipe, a claw having a milk receiving chamber in communication with the inner chambers of the four teat cups and with the milk pail and having also two pulsation chambers each in communication with the outer chambers of two teat cups, an air reservoir, a valve chamber, a valve therein connected with the main pipe and controlled in its operation by the master pulsations therein and adapted in its movement to connect said air reservoir alternately with the atmosphere and with the milk receiving chamber and also to connect the pulsation chambers alternately with the atmosphere and with the vacuum pipe beyond the non-return valve.

37. A milking machine comprising, in combination, four double-chambered teat cups, a vacuum pipe, a milk pail, means to establish suction in the vacuum pipe and in the milk pail, a pulsator consisting of a claw having a valve chamber, a central chamber in communication with the inner chambers of the four teat cups and with the milk pail and two flanking chambers each in communication with the outer chambers of two teat cups, air reservoirs, and a valve in the valve chamber adapted to be controlled in its movement by master pulsations and adapted in its movement to connect said air reservoirs alternately with the atmosphere and with said central chamber and also adapted in its movement to connect the flanking chambers alternately with the atmosphere and with the vacuum pipe.

In testimony of which invention, I have hereunto set my hand, at Poughkeepsie, N. Y., on this 30th day of Jany., 1915.

MEREDITH LEITCH.

Witnesses:
   CHARLES L. POWELL,
   EDWARD F. WEIMAR.